US009997978B2

(12) United States Patent
Hovakimian

(10) Patent No.: US 9,997,978 B2
(45) Date of Patent: Jun. 12, 2018

(54) APPARATUS AND METHODS FOR GENERATING ELECTRICITY FROM COMPOSTING

(71) Applicant: Henry Hovakimian, Whittier, CA (US)

(72) Inventor: Henry Hovakimian, Whittier, CA (US)

( * ) Notice: Subject to any disclaimer, the term of this patent is extended or adjusted under 35 U.S.C. 154(b) by 58 days.

(21) Appl. No.: 15/096,052

(22) Filed: Apr. 11, 2016

(65) Prior Publication Data

US 2016/0301285 A1    Oct. 13, 2016

Related U.S. Application Data

(60) Provisional application No. 62/145,462, filed on Apr. 9, 2015.

(51) Int. Cl.
| | |
|---|---|
| *H02K 7/18* | (2006.01) |
| *H02K 15/14* | (2006.01) |
| *F03D 9/00* | (2016.01) |
| *H02P 9/04* | (2006.01) |

(52) U.S. Cl.
CPC ............. *H02K 7/1823* (2013.01); *F03D 9/00* (2013.01); *H02K 15/14* (2013.01); *H02K 7/183* (2013.01); *H02P 9/04* (2013.01); *Y02E 10/72* (2013.01)

(58) Field of Classification Search
CPC ...... H02K 7/1823; H02K 15/14; H02K 7/183; H02P 9/04; Y02E 10/72
USPC .......................................................... 290/52
See application file for complete search history.

(56) References Cited

U.S. PATENT DOCUMENTS

| | | | |
|---|---|---|---|
| 4,275,309 A | | 6/1981 | Lucier |
| 4,433,544 A | * | 2/1984 | Wells ...................... F03D 9/007 290/55 |
| 4,755,690 A | * | 7/1988 | Obermeyer ............. F03B 13/08 290/52 |
| 5,323,061 A | * | 6/1994 | Immler ............... F24D 11/0235 290/1 R |
| 5,395,598 A | | 3/1995 | Prueitt |
| 6,626,636 B2 | | 9/2003 | Bohn |
| 6,647,717 B2 | | 11/2003 | Zaslavsky |
| 7,757,490 B2 | | 7/2010 | Kenessey |
| 7,821,151 B2 | | 10/2010 | Le |

(Continued)

OTHER PUBLICATIONS

Anderson et al., 'Thermal-Fluids Analysis of a Hybrid Solar/Compost Waste Heat Updraft Tower', Journal of Clean Energy Technologies, vol. 4, No. 3, May 2016.*

(Continued)

*Primary Examiner* — Sean Gugger
(74) *Attorney, Agent, or Firm* — Loza & Loza, LLP; Razmig Messerian

(57) ABSTRACT

One feature pertains to an apparatus that includes a segmented collector region, a hollow tower, and one or more turbines. The segmented collector region includes a plurality of sectors each capable of receiving compostable matter that heats air within the sectors as the compostable matter composts. The hollow tower includes a first end and a second end, where the first end of the hollow tower is coupled to the segmented collector region to allow airflows from the heated air in the plurality of sectors to flow from the plurality of sectors to the first end of the tower and then rise up through the hollow tower to the second end of the tower. The one or more turbines are positioned in a path of at least one of the airflows to generate electricity.

16 Claims, 14 Drawing Sheets

(56) References Cited

U.S. PATENT DOCUMENTS

| | | | |
|---|---|---|---|
| 7,956,487 B2 | 6/2011 | Hovakimian | |
| 9,097,241 B1* | 8/2015 | Hollick | F03G 6/045 |
| 2004/0237524 A1* | 12/2004 | Thiagarajan | F03D 1/04 |
| | | | 60/641.8 |
| 2009/0152370 A1* | 6/2009 | Pesochinsky | A01G 15/00 |
| | | | 239/2.1 |
| 2009/0212570 A1* | 8/2009 | Le | F03D 9/007 |
| | | | 290/52 |
| 2010/0018205 A1* | 1/2010 | Chen | F03D 1/04 |
| | | | 60/641.8 |
| 2010/0200034 A1* | 8/2010 | Miller | E04H 15/16 |
| | | | 135/94 |
| 2010/0219637 A1* | 9/2010 | Hovakimian | F03D 9/00 |
| | | | 290/52 |
| 2011/0021134 A1 | 1/2011 | Zwern | |
| 2011/0031750 A1* | 2/2011 | Kreissig | F03B 13/1885 |
| | | | 290/53 |
| 2011/0052369 A1* | 3/2011 | Michaud | F03D 9/007 |
| | | | 415/4.2 |
| 2011/0289992 A1* | 12/2011 | Allen | C05F 17/00 |
| | | | 71/23 |
| 2014/0284928 A1* | 9/2014 | Mital | F03D 3/02 |
| | | | 290/52 |
| 2014/0361548 A1* | 12/2014 | Holscher | E04H 1/1261 |
| | | | 290/55 |
| 2016/0097374 A1* | 4/2016 | Hollick | F03D 9/37 |
| | | | 136/248 |

OTHER PUBLICATIONS

Robert Spencer, A New Generation of Commercial Disposers, Biocycle Magazine, Jul. 2008, vol. 49, No. 7, p. 27, The JG Press, Inc., Emmaus, PA, United States.

Aja et al., Review of Municipal Solid Waste Management Options in Malaysia, with an Emphasis on Sustainable Waste-To-Energy Options, Journal of Material Cycles and Waste Management, Oct. 2014, vol. 16, No. 4, p. 693-710, Springer Link.

* cited by examiner

APPARATUS AND METHODS FOR GENERATING ELECTRICITY FROM COMPOSTING

CLAIM OF PRIORITY

The present application for patent claims priority to provisional application No. 62/145,462 entitled "Compost Updraft Tower" filed Apr. 9, 2015, the entire disclosure of which is hereby expressly incorporated by reference.

BACKGROUND

Field

This application generally relates to power production and waste processing. More specifically, it relates to systems and methods for extracting heat energy from compostable material and converting this energy to electricity with the aid of an updraft tower.

Background Art

One of the major problems facing the United States, indeed the world, is that of landfill pollution and inefficient waste processing. Every year the United States alone produces hundreds of millions of tons of municipal solid waste. Much of this waste is not recycled or composted. Of the portion that is composted, the heat energy generated by the composting process is almost never utilized. Additionally, locating potential landfill sites poses a significant problem as well. Landfills may contaminate ground water or cause other environmental and hazards and undesired aesthetic concerns.

Moreover, a chief concern facing the planet is finding alternative, renewable energy sources to replace conventional power plants that burn fossil fuels. Fossil fuel burning power plants, such as coal or oil burning plants, produce a host of unwanted greenhouses gases, which are believed to be a major contributor of global warming.

U.S. Pat. No. 4,275,309 describes a system for converting solar heat into electrical energy. The system has a collector region where large volumes of air are heated by the sun. This heated air then flows at a high speed towards the center of the structure due to a large pressure differential caused by a tall chimney-like tower that extends upward from the base of the structure. The high speed air drives a turbine that generates electricity. In the art, such systems are also known as solar updraft towers. However, solar updraft towers in the prior art heat the air in their collector region with only solar energy.

Composting is the purposeful biodegradation of organic matter, such as yard and food waste, performed by microorganisms, such as bacteria, yeasts and fungi. The microorganisms consume the organic, carbon containing matter and break it down into its simplest parts. This produces a fiber-rich, carbon-containing humus with inorganic nutrients like nitrogen, phosphorus and potassium that can be used as fertilizer, potting soil, or for other important agricultural purposes. Through aerobic respiration microorganisms use oxygen and water to break the matter down. This process generates heat. Temperatures within compost piles can rise as high as 100 to 150 degrees Fahrenheit. Many commercial composting facilities do not harvest or otherwise use the ample heat energy released during the composting process, and allow it to dissipate into the surrounding environment.

U.S. Pat. No. 7,956,487, which was issued to the inventor of the present application, describes a compost updraft tower that harnesses the heat energy produced during the composting process and converts that heat energy into electricity through the use of an updraft tower. Despite being groundbreaking at its time, many major developments and improvements to such compost updraft towers have been made by the present applicant since that time.

The aforementioned developments, which are described in greater detail below, significantly increase the efficiency and operability of the compost updraft tower, and also decrease production costs. Thus, there is a need for improved methods and systems for generating electricity from heat energy released during the composting process and the contents of the present patent application address those needs.

SUMMARY

One feature provides an apparatus comprising a segmented collector region including a plurality of sectors each adapted to receive compostable matter that heats air within the sectors as the compostable matter composts, a hollow tower having a first end and a second end, the first end of the hollow tower coupled to the segmented collector region to allow airflows from the heated air in the plurality of sectors to flow from the plurality of sectors to the first end of the tower and then rise up through the hollow tower to the second end of the tower, and one or more turbines positioned in a path of at least one of the airflows to generate electricity. According to one aspect, each of the plurality of sectors are substantially separated from one another by divider walls. According to another aspect, the divider walls extend out away from the hollow tower in a substantially orthogonal direction.

According to one aspect, the plurality of sectors extend out radially from the hollow tower. According to another aspect, the plurality of sectors surround the hollow tower. According to yet another aspect, at least a portion of the collector region includes a roof permeable to solar radiation, the solar radiation further heating air within one or more of the plurality of sectors of the collector region.

According to one aspect, one or more of the sectors includes means for aerating compostable matter. According to another aspect, the means for aerating compostable matter includes aeration piping adapted to reside within a heap of compostable matter placed in the one or more sectors, the aeration piping adapted to deliver oxygen to the heap of compostable matter. According to yet another aspect, an outer perimeter wall of at least one sector includes an air intake turbine that generates electricity as ambient air from outside the collector region flows into the at least one sector.

According to one aspect, the apparatus further comprises a tower turbine positioned within the hollow tower and adapted to generate electricity from airflow rising up from the first end to the second end of the hollow tower. According to another aspect, the apparatus further comprises a turbine service support coupled to at least one of the hollow tower and/or the collector region, the turbine service support adapted to support the tower turbine outside of the hollow tower. According to yet another aspect, the apparatus further comprises at least one solar air heater mounted on a roof and/or a wall of the collector region and adapted to further heat air within one or more of the sectors of the collector region.

Another feature provides an apparatus comprising a collector region adapted to receive compostable matter that heats air within the collector region as the compostable matter composts, a hollow tower having a first end and a second end, the first end of the hollow tower coupled to the collector region to allow airflow from the heated air in the collector region to flow from the collector region to the first end of the tower and then rise up through the hollow tower to the second end of the tower, at least one tower turbine positioned within the hollow tower in a path of the airflow to generate electricity, and a turbine service support coupled to at least one of the hollow tower and/or the collector region, the turbine service support adapted to receive and support the tower turbine outside of the hollow tower. According to one aspect, the hollow tower includes a turbine service door that in an open state allows the tower turbine to be removed from within the hollow tower and be supported by the turbine service support for servicing. According to another aspect, the turbine service support includes a track adapted to secure the tower turbine and assist in removing the tower turbine from the hollow tower. According to yet another aspect, the turbine service support is further adapted to store and support a reserve tower turbine.

Another feature provides a method comprising composting compostable matter within a plurality of sectors of a segmented collector region to release heat energy from the compostable matter, generating an airflow in each of the plurality of sectors of the collector region by coupling a first end of a hollow tower to the collector region, the airflows moving through the plurality of sectors of the collector region to the first end of the hollow tower and then rising through the hollow tower to a second open end of the tower, and generating electricity by positioning one or more turbines in a path of at least one of the airflows. According to one aspect, the method further comprises maintaining compostable matter in the plurality of sectors at different stages of a composting cycle to vary velocities of the airflows generated in each of the plurality of sectors.

According to one aspect, the method further comprises controlling an amount of electricity generated by the one or more turbines by activating and/or deactivating one or more of the plurality of sectors. According to another aspect, the method further comprises removing a tower turbine positioned within the hollow tower by moving the tower turbine out of the hollow tower and onto a turbine service support coupled to the hollow tower, and positioning a reserve tower turbine within the hollow tower by moving the reserve tower turbine stored at the turbine service support into the hollow tower.

DETAILED DESCRIPTION

In the following description numerous specific details may be set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention. For example, the term "turbine" is frequently used herein as a component that extracts energy from fluid flow and converts it into electricity. To do so the turbine includes and/or is coupled to any means for converting mechanical energy/power into electrical energy/power, such as a generator or alternator. As used herein, the term "compostable matter" refers to any material or matter that is compostable including, but not limited to, food (e.g., food waste), plants, dead animals, animal waste, and/or decaying organic substances, and may also contain some amount of non-compostable matter that was not removed during a waste sorting process.

Segmented Compost Updraft Tower

Figure 1:
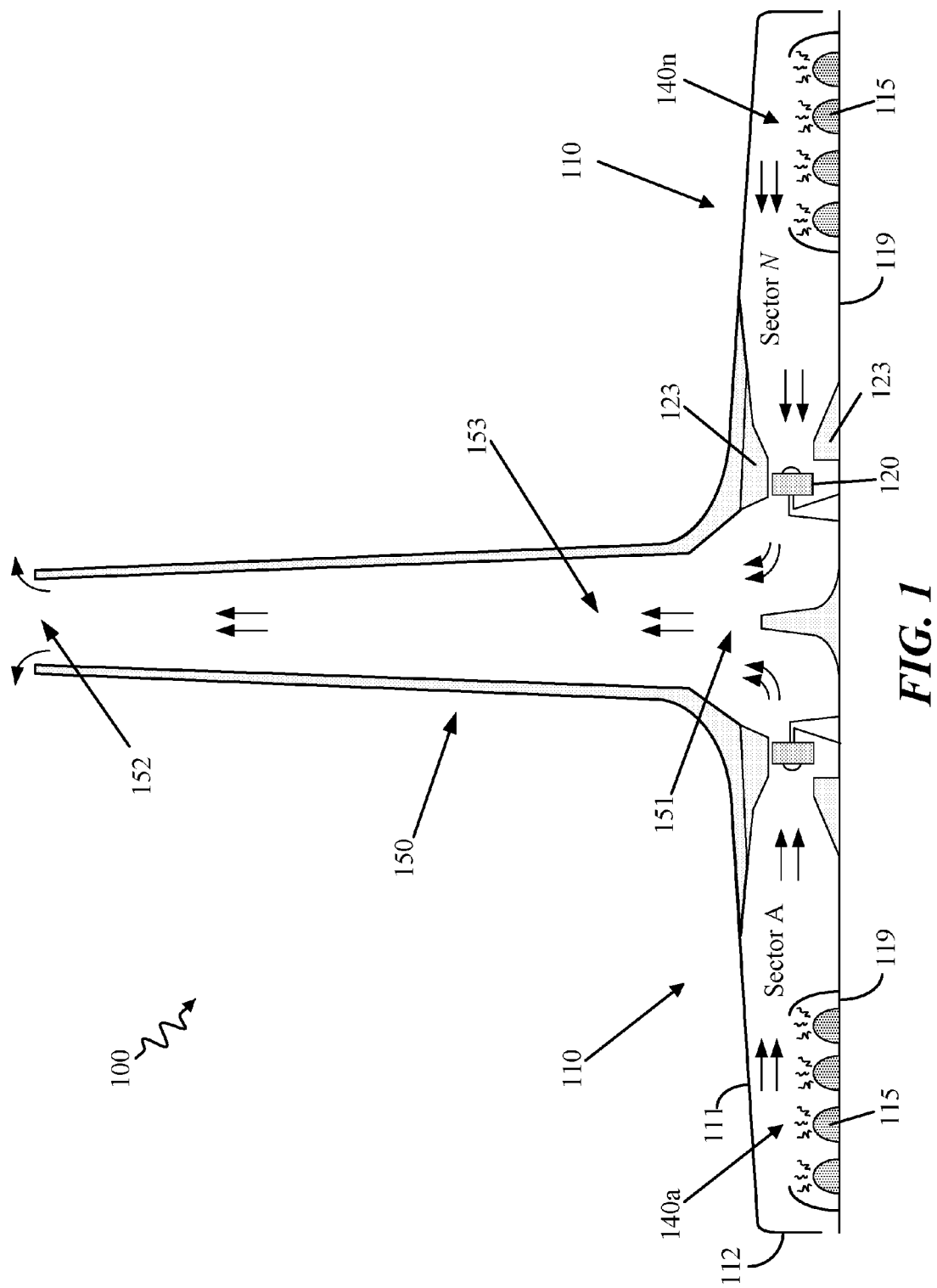
FIG. 1 illustrates a schematic representation of a cross-sectional view of a segmented compost updraft tower.
Figure 2:
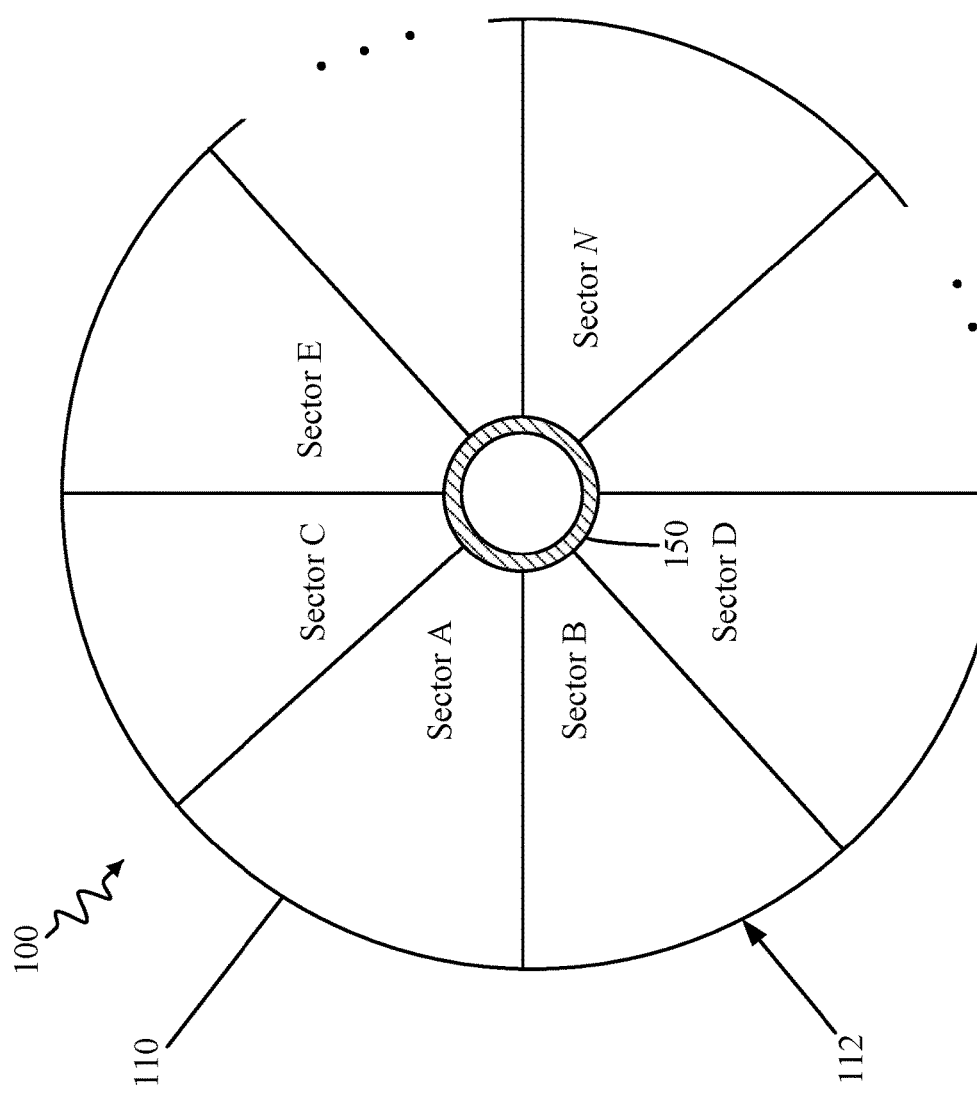
FIG. 2 illustrates a schematic top view of a segmented compost updraft tower.

FIGS. 1 and 2 illustrate a novel segmented compost updraft tower 100 according to one embodiment of the present disclosure. Specifically, FIG. 1 illustrates a schematic representation of a cross-sectional view of the segmented compost updraft tower 100, and FIG. 2 illustrates a schematic top view of the segmented compost updraft tower 100. The compost updraft towers described herein may also be referred to herein as "power plants."

Referring to FIGS. 1 and 2, the segmented compost updraft tower 100 includes a collector region 110 having a plurality of separate and independent sectors A-N and a hollow tower 150. Specifically, the collector region 110 is made up of N number of sectors that each have their own composting area 140*a*-140*n*. Here, N may be any integer number equal to or greater than two (2), including 4, 6, 8, 12, 24, etc. The sectors A-N may each extend out radially from the hollow tower 150. Within each sector's composting area 140*a*-140*n*, piles of compostable matter 115 may be introduced. This compostable matter 115 includes bio-degradable organic materials capable of being composted.

Under appropriate conditions, the piles of compostable matter 115 will undergo composting. To efficiently expedite the composting process, and thereby generate more heat, the piles may contain organic material that has about a 30:1 ratio of carbon to nitrogen (C:N ratio). The piles may also be provided with sufficient amounts of oxygen and water to sustain the aerobic respiration performed by the microorganisms.

The heat energy generated by the piles of compostable matter 115 heats the air contained within the collector region's 110 sectors A-N. Since the collector region 110 is coupled to the tall hollow tower 150, convection currents and airflows (shown by the double arrows in FIG. 1) of this heated air are generated and flow toward the first end 151 (e.g., first open end) of the hollow tower 150 due to the stack effect (e.g., chimney effect). The airflows then flow up and through the hollow tower 150 and out the hollow tower's second end 152 (e.g., "second open end"). Along the way, the airflows go past and drive one or more turbines 120 that generate electricity. The one or more turbines 120 may be placed within the collector region 110 near the base 151 of the tower 150 as shown in FIG. 1, and/or may be placed within the hollow tower 150 itself. Air constrictors 123 may be strategically placed to funnel and focus the airflows directly at the turbines 120 to increase efficiency and electrical output of the turbines 120.

The larger the collector region 110 and the more sectors that are active (i.e., filled with and actively composting compostable matter) the greater the amount of heat that can be generated within the collector region 110. This leads to a greater temperature difference between the ambient air outside the compost updraft tower 100 and the heated air within the collector region 110. Moreover, the greater in height the hollow tower 150, the greater the pressure difference will be between the ambient air outside the compost updraft tower 100 and air within the compost updraft tower 100 (e.g., air near the base 151 of the tower 150). The greater this pressure and temperature differential is the greater the wind speed of the airflows will be at the turbines 120. The greater the wind speed at the turbines 120 the more power is generated by the turbines 120 (i.e., the more electrical energy is generated).

Referring to FIG. 2, advantageously the segmented compost updraft tower 100 allows the plant operator to activate or deactivate sectors as needed to increase or decrease the electrical/power output of the power plant 100. A sector may be activated by loading the sector with compostable matter and initiating the composting process (e.g., by providing sufficient water, oxygen, heat, etc. to the compostable matter). A sector may be deactivated by removing the compostable matter from the sector or by closing a passage way between the sector and the plant's turbines 120 to prevent airflow within the deactivated sector from flowing towards a turbine 120.

Figure 3:
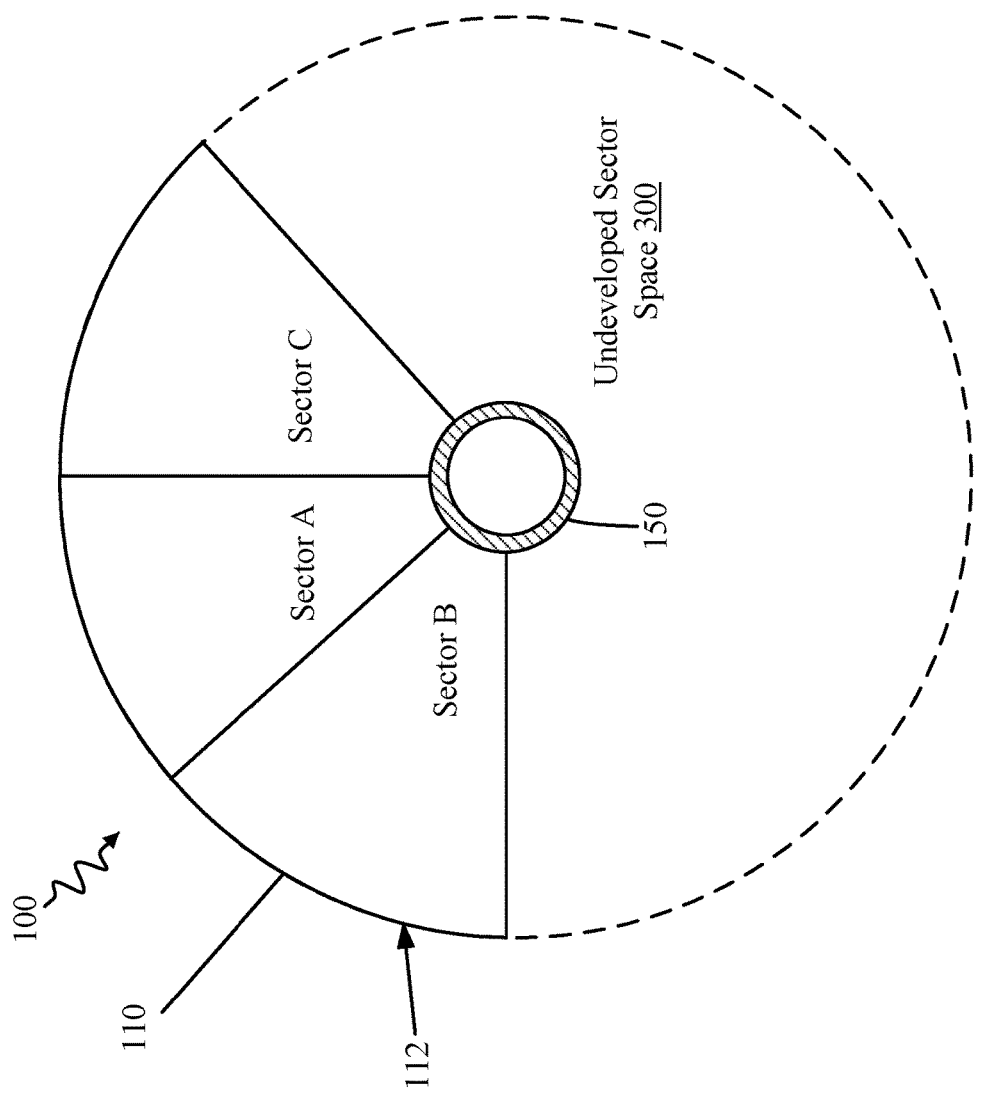
FIG. 3 illustrates a partially built-out, segmented compost updraft tower having undeveloped sector space.

Another advantage of a segmented compost updraft tower 100 design is that its modular nature allows the plant owner to build additional sectors as they are needed (e.g., as additional power output is needed) and/or as budgetary considerations provide. FIG. 3 illustrates this concept and shows a partially built-out, segmented compost updraft tower 100 having undeveloped sector space 300 that may be converted into additional sectors at some future time. Note that sectors A-C shown are fully functional sectors that are coupled at one end to the hollow tower 150 and can receive compostable matter so that the plant 100 can generate electricity. Additional sectors that surround and couple to the hollow tower 150 may then be built on the undeveloped sector space to increase the plant's 100 potential power output.

The compost updraft tower 100 shown in FIGS. 1-3 features a collector region 100 and a hollow tower 150 having a circular shape. However, these shapes shown are merely illustrative and in practice the collector region 110 and the hollow tower 150 may have any other shape including, but not limited to, square, rectangular, pentagonal, hexagonal, octagonal, etc. As just one example, the segmented compost updraft tower 400 shown in FIGS. 4-5 and described below features a square/rectangular collector region coupled to a circular hollow tower.

Figure 4:
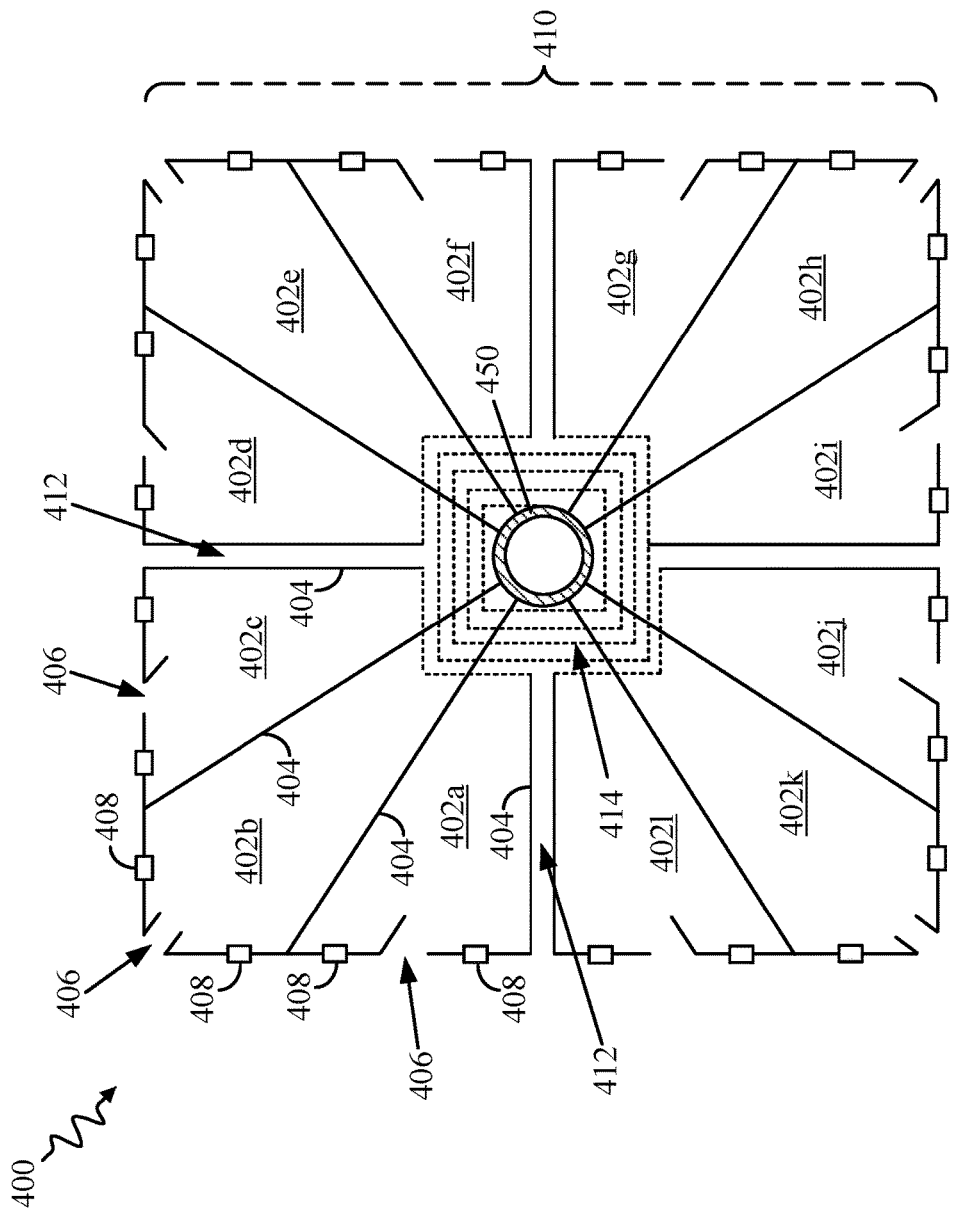
FIG. 4 illustrates a schematic representation of a top, cross-sectional view of another segmented compost updraft tower.
Figure 5:
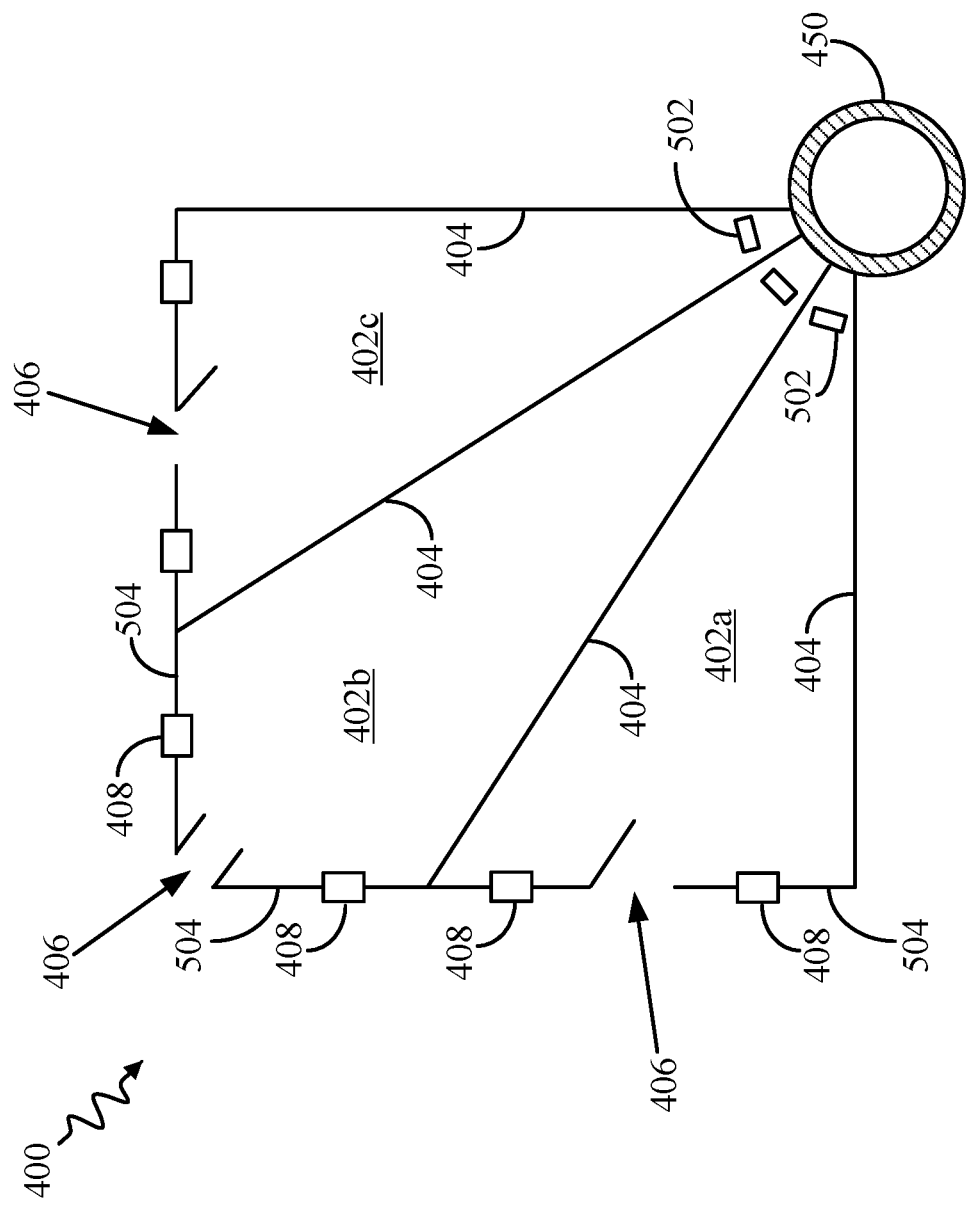
FIG. 5 illustrates a detailed view of the segmented compost updraft tower shown in FIG. 4.

FIG. 4 illustrates a schematic representation of a top, cross-sectional view of a segmented compost updraft tower 400 according to one embodiment of the disclosure. FIG. 5 illustrates the compost updraft tower 400 in greater detail. Referring to FIGS. 4 and 5, the collector region 410 may be divided up into a plurality of sectors 402a-402l (e.g., chambers) that are each substantially separated from one another by sector divider walls 404. According to one aspect and shown in FIGS. 4 and 5, the divider walls 404 extend out away from the hollow tower 450 in a substantially orthogonal direction (e.g., the divider walls 404 extend out away radially from the hollow tower 450). In the example illustrated in FIG. 4, the collector region 410 includes twelve (12) sectors, however, the collector region 410 may have any number of sectors equal to or greater than two (2).

Referring to FIGS. 4 and 5, each sector 402a-402l may store compostable matter that generates heat and causes heated air to flow and drive turbines 502 of the compost updraft tower 400. The compostable matter may be brought into and dropped off into the sectors 402a-402l through one or more doors and/or access points 406 located along the perimeter of the collector region 410 and be given time to compost. Once the compostable matter has fully composted and no longer generates a sufficient amount of heat it is removed from the sectors 402a-402l and new compostable matter may be introduced into the sectors 402a-402l. The resulting end product that remains after the composting process may be utilized further in separate agricultural industries and thus may be sold accordingly. In this fashion, the compost updraft tower 400 is not merely a power plant but is also a waste management facility that converts waste that would ordinarily end up in a landfill into a resource that can be used for other applications.

According to one embodiment, each sector 402a-402l of the collector region 410 may include one or more air intake turbines, fans, and/or ducts 408 that allow ambient air from outside the plant 400 to enter the sectors 402a-402l. These turbines, fans, and/or ducts 408 may be located on the perimeter walls 504 of the sectors 402a-402l. In the case where these units 408 are air intake turbines, they too may generate power and electricity. Thus, in addition to whatever power generating turbines 502 are located near the base of the tower 450 or within the tower 450, power generating turbines 408 may be located along the perimeter of the collector region 410 as well on outside perimeter walls 504 of the sectors 402a-402l.

According to another embodiment, the compost updraft tower 400 may also include one or more access roads 412 that allow vehicles and personnel to access inner portions of the collector region 410. These vehicles may include trucks, cars, bulldozers, cranes, etc. Cranes, for example, may use the access roads 412 to reach the roofs of the sectors 402a-402l for maintenance work. The access roads 412 may also allow personnel and vehicles to access a central service road 414. The central service road 414 allows access to components and parts located deep in the interior of the compost updraft tower 400 including the hollow tower 450 and turbines 502, among other things. According to one example, the central service road 414 may be have a rising spiral structure (as shown by the dashed lines in FIG. 4) to allow personnel and vehicles to access/service components located above the ground floor of the collector region 410.

According to one embodiment, the compostable matter in the plurality of sectors 402a-402l may be undergoing different stages in the composting process because the compostable matter may have been introduced into the sectors 402a-402l at different times. For example, compostable matter present in a first sector 402a may be brand new compostable matter that was just brought in, whereas the compostable matter present in another sector 402l may be ready to be removed because the compostable matter has composted to such a degree that it no longer generates sufficient heat. Still yet compostable matter in other sectors 402b-402k in between those two sectors 402a, 402l may be undergoing intermediate stages of composting in that they may have composted for some amount of time but still generate sufficient heat as to not necessitate removal.

The segmented compost updraft towers 100, 400 described above therefore advantageously allows a multi-stage composting process where each sector's 402a-402l compostable matter may have composted to a different degree. This allows for the removal of compostable matter from one sector 402l while the rest of the compostable matter in the other sectors 402a-402k continue to compost and generate heat, thereby allowing the compost updraft tower 400 to continue to generate electricity and power even though one of its sectors 402l is undergoing maintenance (e.g., old compostable matter is being replaced with new).

Tower Mounted Turbine with Turbine Service Support

Figure 6:
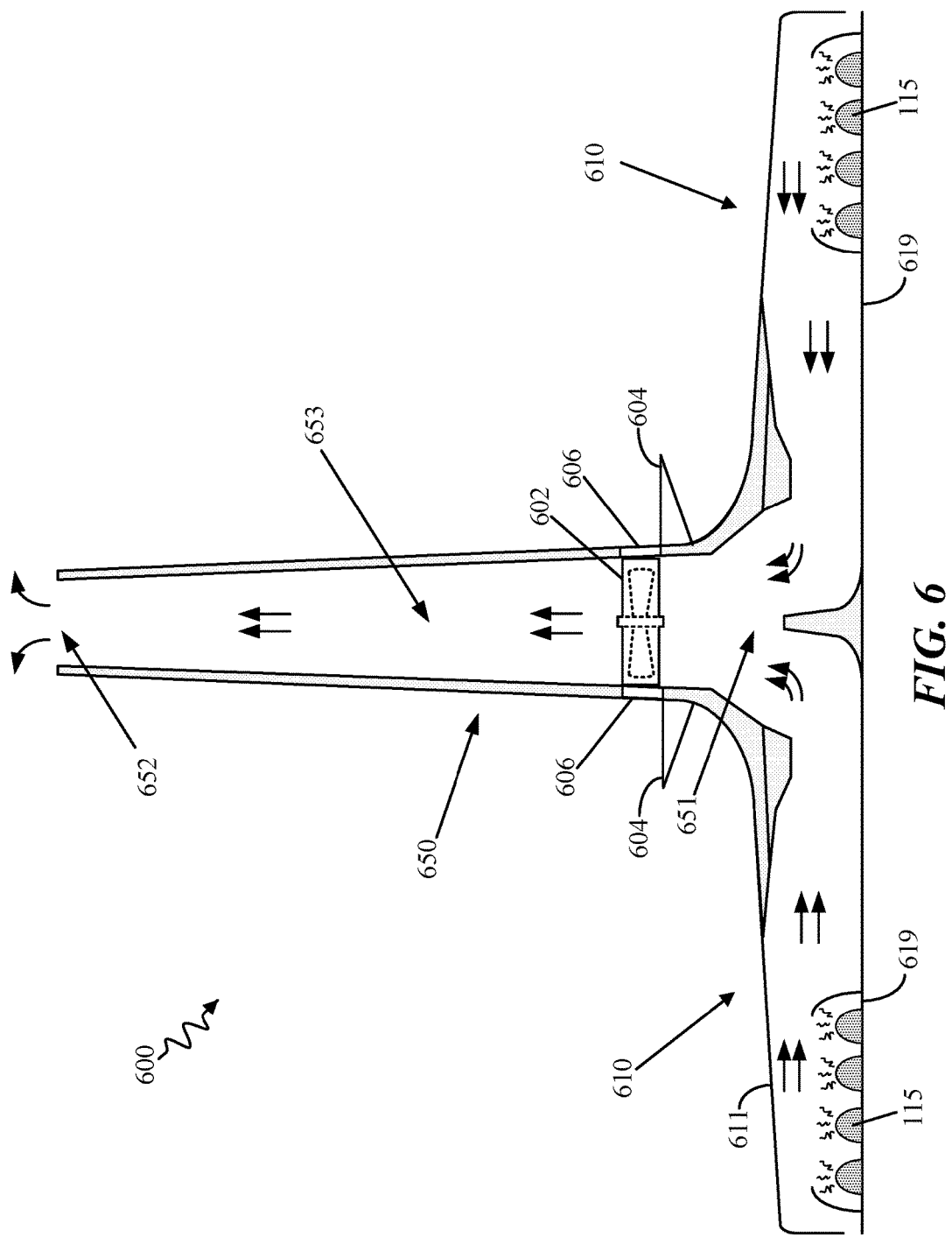
FIG. 6 illustrates schematic representation of a cross-sectional view of yet a compost updraft tower.
Figure 7:
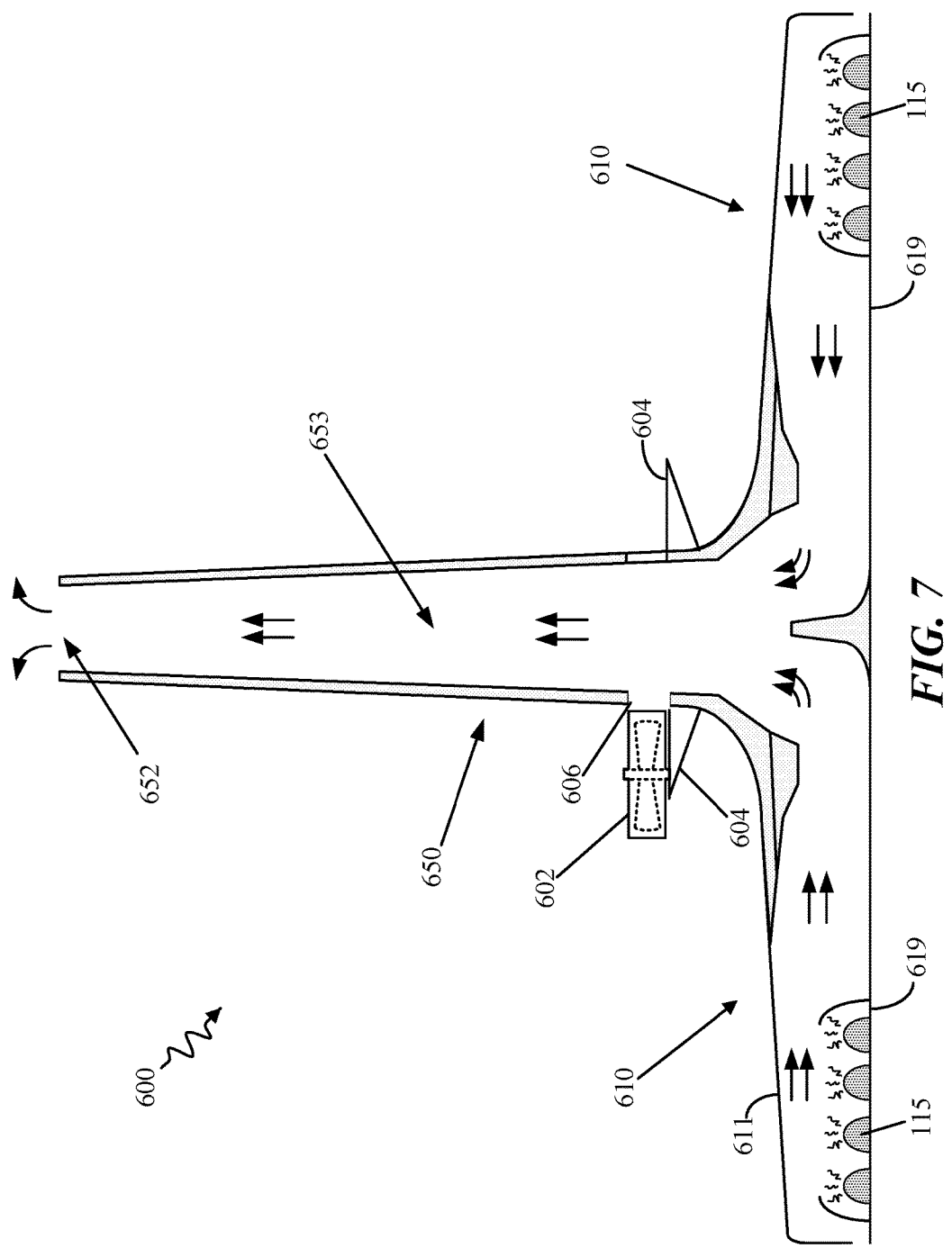
FIG. 7 illustrates a tower turbine after it has been removed from a hollow tower and placed onto a turbine service support of the compost updraft tower of FIG. 6.
Figure 8:
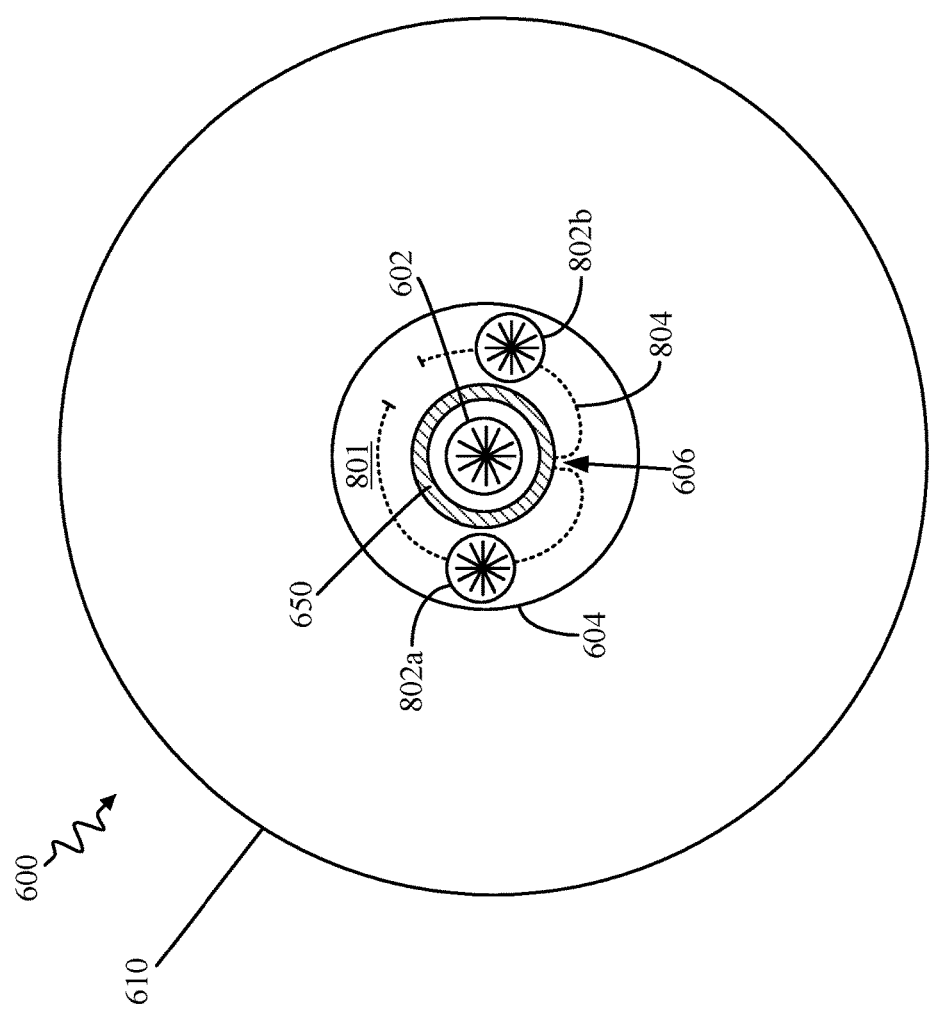
FIG. 8 illustrates one or more tower turbines supported by the turbine service support while a first tower turbine operates within a hollow tower of the compost updraft tower of FIG. 6.

FIGS. 6-8 illustrate a compost updraft tower 600 according to another embodiment of the disclosure. Specifically, FIGS. 6 and 7 illustrate schematic representations of cross-sectional views of the compost updraft tower 600, and FIG. 8 illustrates a schematic, top-view. The compost updraft tower 600 of FIGS. 6-8 is very similar in operation to the compost updraft towers 100, 400 described above except that the compost updraft tower 600 of FIGS. 6-8 may or may not have sectors (i.e., may or may not be segmented) and includes one or more of the features described below.

Referring to FIG. 6, the compost updraft tower 600 features one or more tower turbines 602 that are mounted within the interior region 653 of the hollow tower 650. In the example shown, only one central/main tower turbine 602 is mounted within the hollow tower's interior 653. In other embodiments, a plurality of turbines may be mounted within the interior region 653 of the hollow tower 650. The tower turbine 602 generates electricity as airflows (indicated by the directional arrows) move past the turbine 602 and up through the second end 652 of the hollow tower 650. As previously discussed, the airflows are generated due to pressure and temperature differences between the heated air inside the compost updraft tower and the ambient air outside.

In order to help service the tower turbine 602, the compost updraft tower 600 features a turbine service support 604 (e.g., turbine service platform) along the outside of the tower 650 above the collector region 610. One or more service doors 606 on the tower itself may be opened and the tower turbine 602 may be removed out from the interior 653 of the tower 650 and onto the turbine service support 604 where it can be more easily accessed by personnel for maintenance.

FIG. 7 illustrates the tower turbine 602 after it has been removed from the tower 650 and placed onto the turbine service support 604. According to one embodiment, another tower turbine (e.g., "reserve tower turbine") may be moved into place within the tower 650 while the old turbine 602 is being serviced. This way the compost updraft tower 600 may continue to operate and generate power while the one or more of the tower turbines 602 are being serviced.

FIG. 8 illustrates how one or more tower turbines 802a, 802b (e.g., reserve tower turbines) may be supported by the turbine service support 604 while a first tower turbine 602 is operating within the hollow tower 650. The turbine service support 604 may include a first support surface 801 that supports the tower turbines 802a, 802b being serviced. According to one embodiment, the turbine service support 604 includes a track 804 to which one or more tower turbines 602, 802a, 802b may secure/couple to and be moved about on while moving out of or into the tower 650. According to one aspect, the turbine service support 604 may include a covering or some housing (not shown) to protect the turbines 802a, 802b being serviced from the elements. The compost updraft tower 600 shown in FIGS. 6-8 may include additional turbines 120, 408, 502 within the collector region 110, 410 (see FIGS. 1, 4, 5) as well as be segmented like the plants 100, 400 of FIGS. 1 and 4.

General Features

Figure 9:
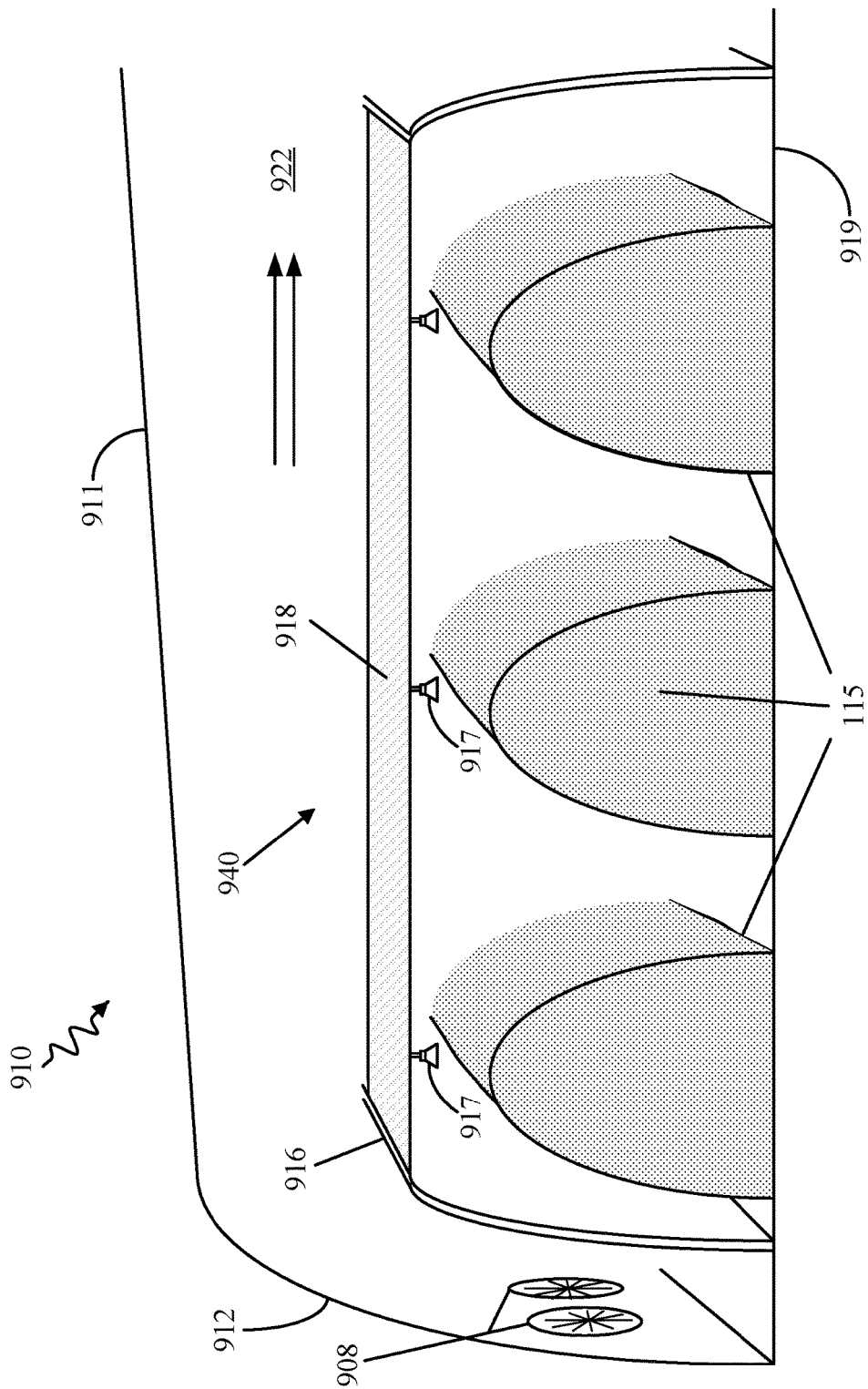
FIG. 9 illustrates a schematic cross-sectional view of an embodiment of a composting area of a collector region.

FIG. 9 illustrates a schematic cross-sectional view of an embodiment of the composting area 940 of a collector region 910. The collector region 910 shown in FIG. 9 may be any one of the collector regions 110, 410, 610 of other compost updraft towers 100, 400, 600 described herein. As described above, compostable matter 115 may be arranged in piles to undergo decomposition within the composting area 940 located within the collector region 910. Air intake turbines, fans, and/or ducts 908 allow ambient air from outside to enter the collector region 910. A perimeter barrier 916 may be constructed to serve as a wall that protects the piles of compostable matter 115 from being disrupted by the incoming air from the air intake turbines, fans, and/or ducts 908.

A compost covering 918 may be situated to cover the compostable matter 115 piles to prevent convection air currents that are flowing toward the interior 922 of the collector region 910 from disrupting the compostable matter 115 piles. The compost covering 918 may also increase wind speed of the convection air currents (i.e., airflows) by reducing drag. The compost covering 918 may be any suitable material that is permeable to the heat energy being released by the compostable matter 115, while also providing the compostable matter 115 piles adequate protection from high winds within the collector region 910. An example of such a material may be a mesh or porous fabric with fine holes. In other embodiments the compost covering 918 may be comprised of a rigid material with holes of suitable size to prevent debris from the compostable matter 115 to escape the composting area 940.

Water sprinklers 917 may also be installed from various locations near the compostable matter 115 piles to provide moisture to facilitate composting. The water sprinklers 917 can provide water via pipes that run parallel along the compost covering 918. In alternative embodiments the water sprinklers 917 can stem from pipes that run along the floor 919 of the collector region 910. In yet alternative embodiments the water sprinklers 917 can be placed along the perimeter barrier 916, and/or other barriers between the piles of compostable matter 115.

According to one embodiment, the collector region's 910 roof 911 may be made of a sufficiently transparent material, such as glass or transparent plastic, that readily allows solar radiation to penetrate through the roof 911 and into the collector region 910. Any material known in the art of greenhouse construction may be used for the roof 911 so long as it sufficiently traps electromagnetic radiation from the sun and prevents the heated air within the collector region 910 from escaping and mixing with the ambient air outside. Examples of materials for the roof 911 include multiwall sheets made of PMMA (Poly-methyl methacrylate or poly-methyl 2-methylpropenoate), such as Plexiglas®, sheets of a polycarbonates, or polyethylene films.

The solar radiation from the sun heats the air within the collector region 910 along with other materials or objects within the collector region 910 that are capable of absorbing solar radiation, such as rocks, gravel, tanks full of water, compost, etc. that eventually will re-radiate this heat energy warming the air within the collector region 910 further.

The roof 911 of the collector region 910 may be substantially sealed so as not to allow the heated air within the collector region 910 to escape and mix with the ambient air immediately outside the collector region 910. The roof 911 of the collector region 910 may also have a rising slope as it progresses from the outer perimeter wall 912 of the collector region 910 toward the tower. The rising slope may help facilitate proper air flow toward the turbines (e.g., turbines 120, 502, 602 of FIGS. 1, 5, 6) of a compost updraft tower.

The floor 919 of the collector region 910, which includes the composting area 940 within, may be comprised of a concrete slab to help support weight of the compost updraft tower and all compost, materials, and equipment within. The floor 919 of the collector region 910 may have a slight slope (not shown) in order to facilitate proper drainage of waste liquids that may otherwise accumulate in the collector region 910. Alternatively drain holes and drainage pipes (not shown) may be installed in the floor 919 to carry away such waste liquid. Again, features of the collector region 910 of FIG. 9 may be applicable to the collector regions and any sectors therein of the other compost updraft towers described herein. These features include, but are not limited to, their roofs 111, 611, floors 119, 619, perimeter walls 112, 504, etc.

Figure 10:
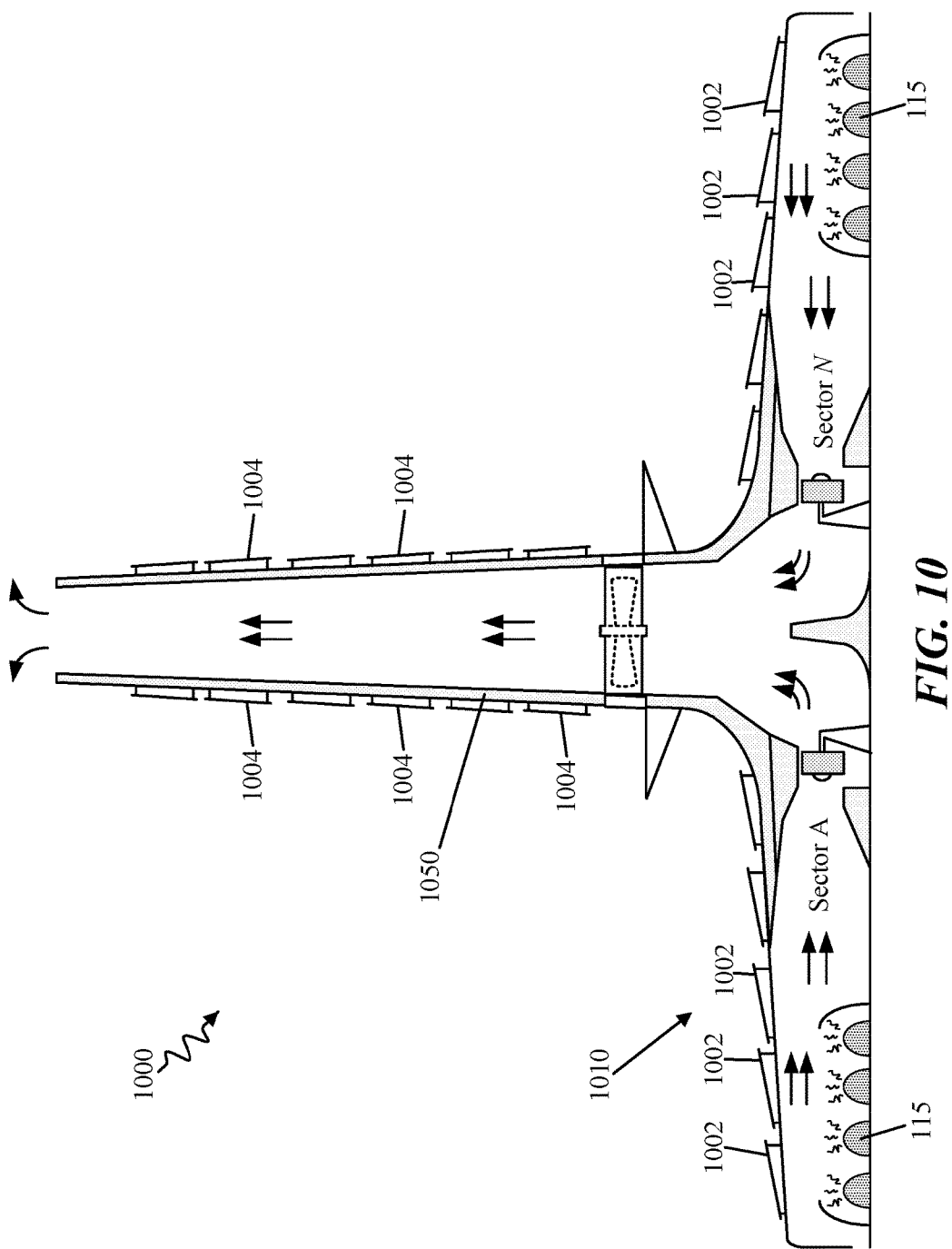
FIG. 10 illustrates a schematic, cross-sectional view of a compost updraft tower featuring solar panels.

FIG. 10 illustrates a compost updraft tower 1000 according to one embodiment of the disclosure. The compost updraft tower 1000 shown in FIG. 10 may be anyone of the other compost updraft towers described herein with the addition of a plurality of solar panels (e.g., photovoltaic system) 1002, 1004 coupled to the compost updraft tower 1000 that help generate electricity using renewable means. The electricity generated may help provide the power needs of the compost updraft tower 1000 itself and may also supply additional power output of the plant 1000. Thus, the compost updraft tower 1000 may generate electricity by harnessing the power created by composting compostable matter and also by converting sunlight directly into electricity. According to one example, solar panels 1002 may be affixed on top of the collector region 1010. According to another example, solar panels 1004 may be affixed to the sides of the tower 1050.

Figure 11:
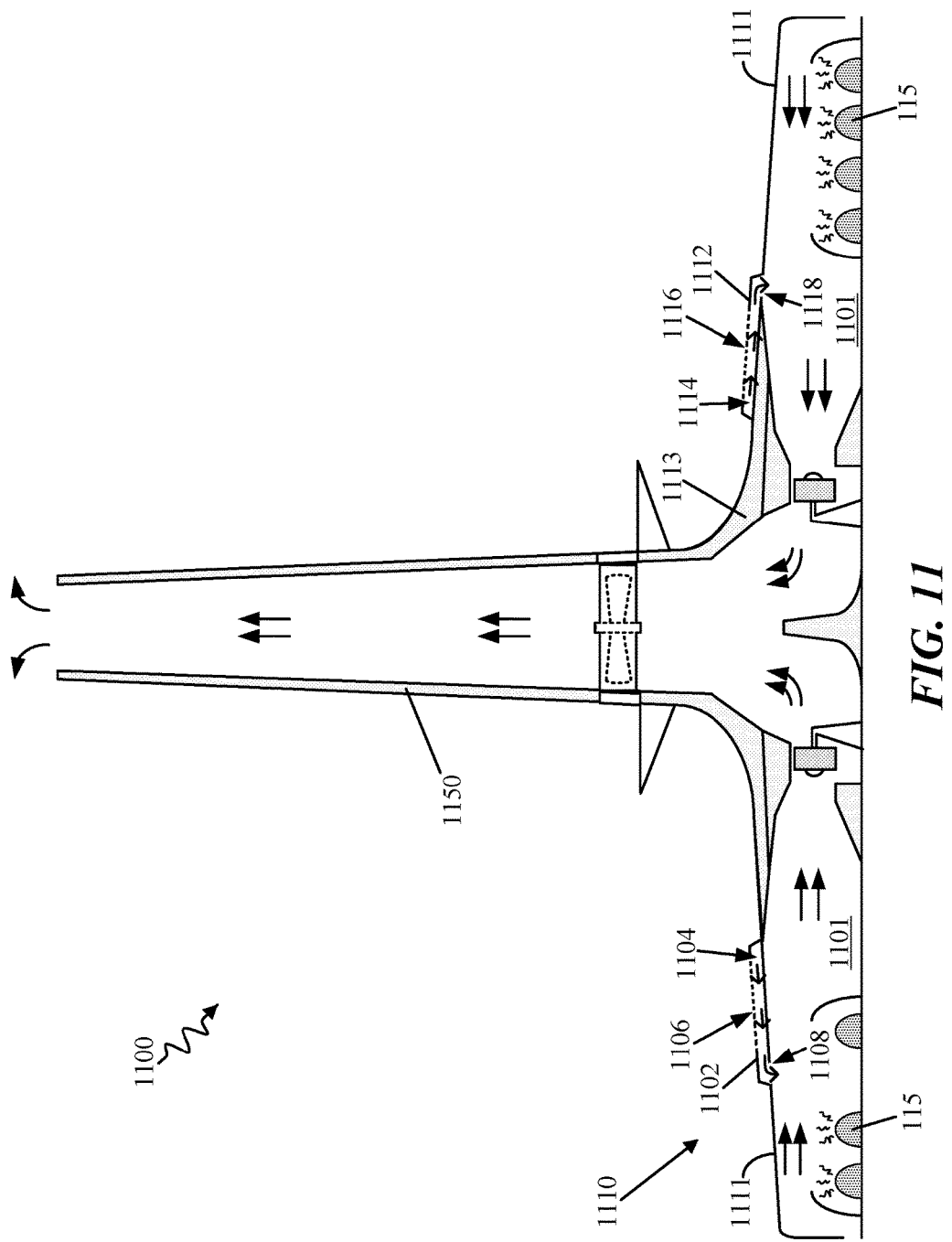
FIG. 11 illustrates a schematic, cross-sectional view of a compost updraft tower featuring solar air heaters.
Figure 12:
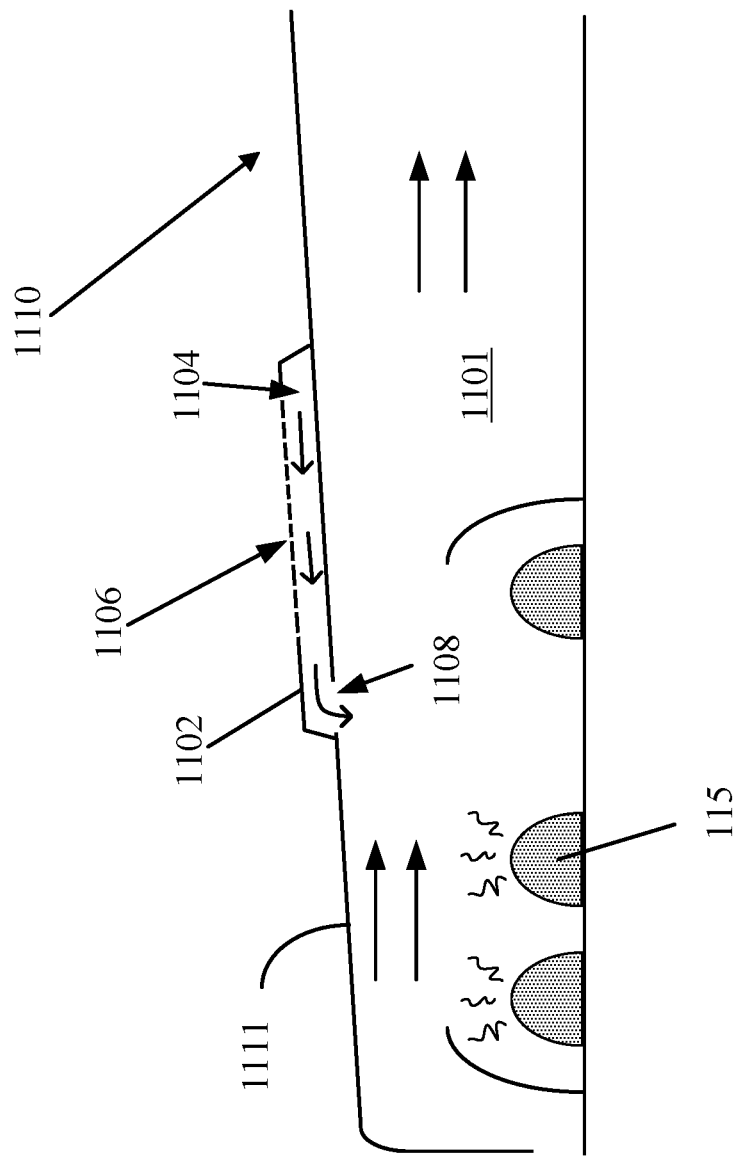
FIG. 12 illustrates a detailed close-up view of one of the solar air heaters shown in FIG. 11.

FIG. 11 illustrates a schematic, cross-sectional view of a compost updraft tower 1100 according to another embodiment of the disclosure. The compost updraft tower 1100 shown in FIG. 11 may be anyone of the other compost updraft towers described herein with the addition of one or more solar air heaters 1102, 1112. The solar air heaters 1102, 1112 may be unglazed air collectors and/or transpired solar collectors. FIG. 12 illustrates a detailed close-up view of one of the solar air heaters 1102.

The solar air heaters 1102, 1112 heat air located within an interior air cavity region 1104, 1114 of the solar air heater 1102, 1112. The exterior surface 1106, 1116 of the solar air heaters 1102, 1112 may have a myriad of tiny perforations (e.g., micro-perforations, holes, etc.) that allow the boundary layer of heat to be captured and uniformly drawn into the interior air cavity region 1104, 1114. This heated air is then drawn into the interior 1101 of the collector region 1110 (and one or more sectors it may have) through vents 1108, 1118, as shown by the directional arrows located within the air cavity regions 1104, 1114. The heated air drawn into the interior 1101 of the collector region 1110 raises the temperature inside the collector region 1110 and may accelerate composting and increase power production of the compost updraft tower 1100.

According to one example, a solar air heater 1102 may be placed on the transparent roof 1111 of the collector region 1110. According to another example, a solar air heater 1112 may be placed on an opaque portion 1113 of the collector region 1110 near the base of the tower 1150. The size and placement of the solar air heaters 1102, 1112 in FIG. 11 are merely exemplary. In practice, solar air heaters may be placed anywhere on the compost updraft tower 1100 that allows air to be heated and enter the interior 1101 of the collector region 1110.

Figure 13:
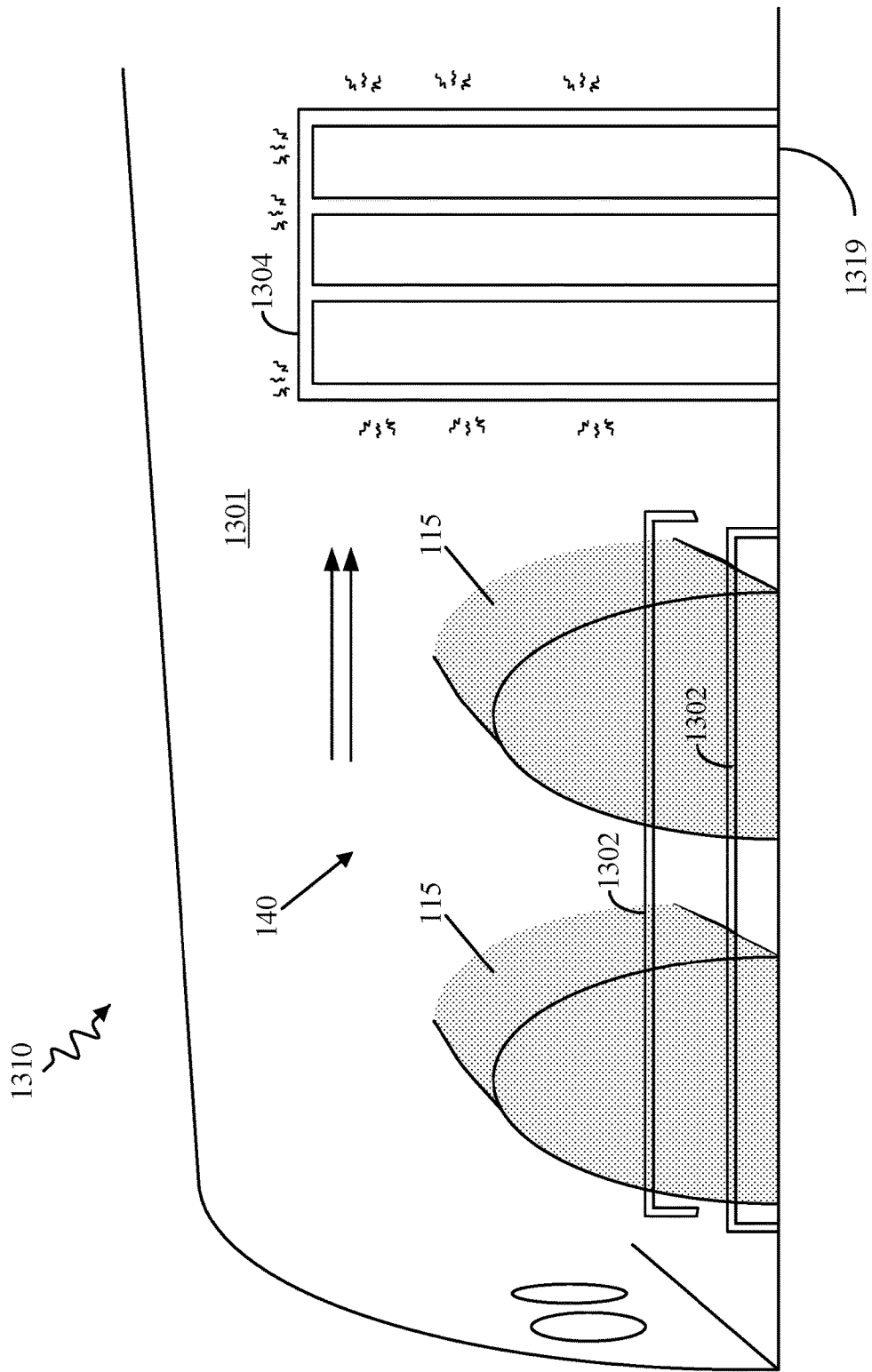
FIG. 13 illustrates a cross-sectional view of a collector region of a compost updraft tower featuring metal heat piping and an aeration system.

FIG. 13 illustrates a side, cross-sectional view of a collector region 1310 of a compost updraft tower according to another embodiment of the disclosure. The collector region 1310 shown in FIG. 13 may be utilized by any one of the compost updraft towers described herein.

Referring to FIG. 13, the collector region 1310 features means for aerating the compostable matter 115 to help assist the composting process. In one example, the means for aerating may be aeration piping 1302 distributed throughout the compostable matter 115 that delivers air (e.g., oxygen, nitrogen, etc.) to the interior of the compostable matter 115. This way the compostable matter 115 may be aerated without having to constantly redistribute (e.g., turn over) the piles of compostable matter 115. The aeration piping 1302 may come out from underneath the ground 1319 of the collector region 1310 or in some aspects it may be supplied from the walls or roof of the collector region 1310. In some aspects the aeration piping 1302 or portions thereof may include water vapor too to help provide moisture to the compostable matter 115.

The collector region 1310 may also feature metal heating piping (e.g., copper heating piping) 1304 that heats the air within the interior 1301 of the collector region 1310. This may be done to increase the temperature of the compost piles 115 to a critical temperature in order to help get the composting process going. In one aspect, the metal heating piping 1304 may be found within the piles of compostable matter much in the same way that the aeration piping 1302 is positioned. In other aspects, the metal heating piping 1304 may be found outside of the compostable piles 115.

According to one embodiment of the disclosure a compost updraft tower may include all of the aforementioned features. For example, a single compost updraft tower may include: the segmented collector region structure described with respect to FIGS. 1-5; the tower turbine 602 and turbine service support 604 of FIGS. 6-8; the various collector region features shown in FIG. 9; the solar panels 1002, 1004 shown in FIG. 10; the solar air heaters 1102, 1112 shown in FIG. 11; the aeration piping 1302 of FIG. 13; and/or the heating piping 1304 also shown in FIG. 13.

Method of Generating Electricity from Composting

Figure 14:
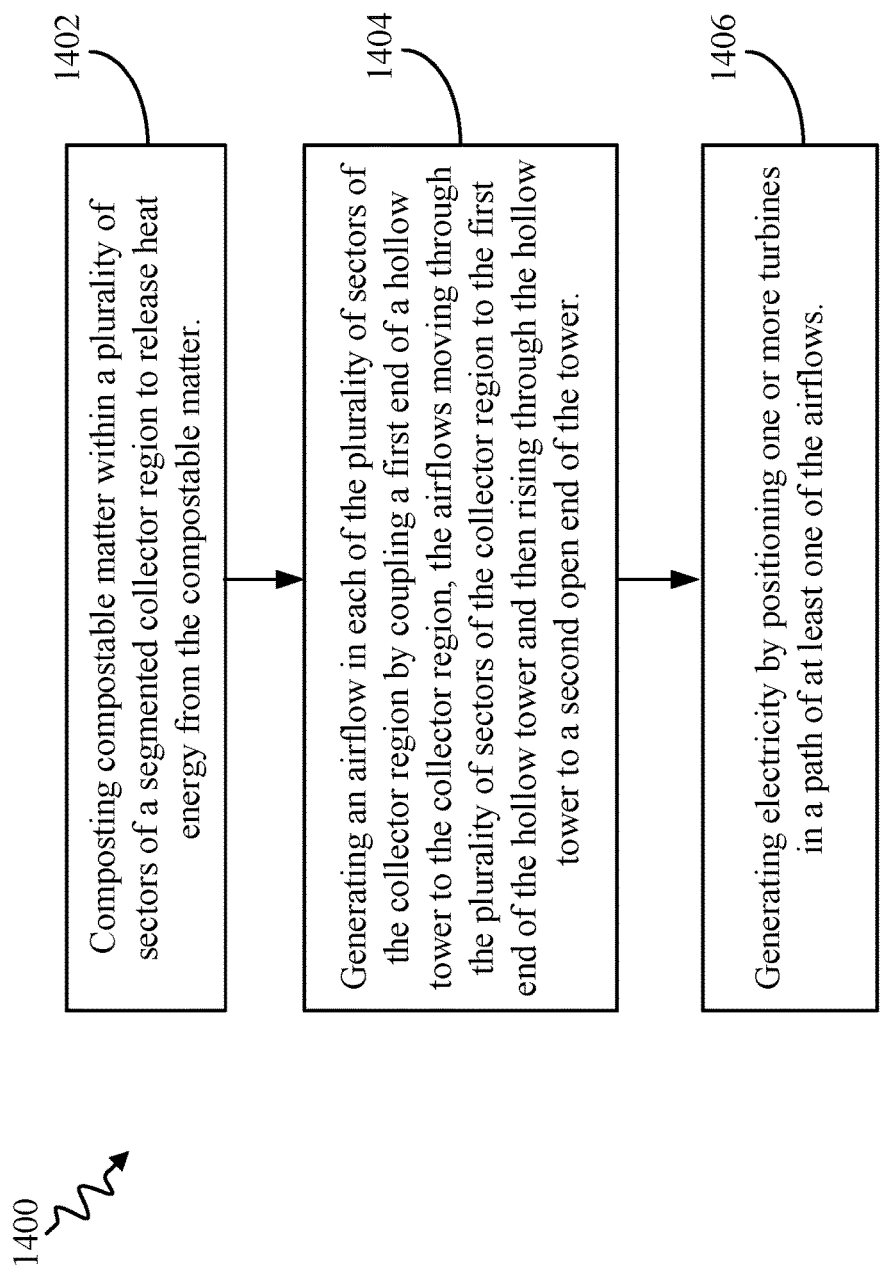
FIG. 14 illustrates a flow diagram for a method of generating electricity using composting.

FIG. 14 illustrates a flow diagram 1400 for a method of generating electricity according to one embodiment of the present disclosure. First, compostable matter may be composted 1402 within a plurality of sectors of a segmented collector region to release heat energy from the compostable matter. Then, an airflow is generated 1404 in each of the plurality of sectors of the collector region by coupling a first end of a hollow tower to the collector region, and where the airflows move through the plurality of sectors of the collector region to the first end of the hollow tower and then rise through the hollow tower to a second open end of the tower.

Next, electricity is generated 1406 by positioning one or more turbines in a path of at least one of the airflows. According to one aspect, compostable matter is maintained in the plurality of sectors at different stages of a composting cycle to vary velocities of the airflows generated in each of the plurality of sectors. According to another aspect, an amount of electricity generated by the one or more turbines is controlled by activating and/or deactivating one or more of the plurality of sectors. In yet another aspect, a tower turbine positioned within the hollow tower is removed by moving the tower turbine out of the hollow tower and onto a turbine service support coupled to the hollow tower, and a reserve tower turbine is positioned within the hollow tower by moving the reserve tower turbine stored at the turbine service support into the hollow tower.

With respect to the various embodiments described herein, it is anticipated that the composting process taking place within the compost updraft towers will be monitored by sensors, engineers, or both, to make sure the compostable matter is adequately decomposing. If the C:N ratio of a compost pile is either too low or too high, various means in the art of composting can be utilized to correct such a deficiency. For example, if the C:N ratio is too low then carbon rich matter can be added to the compostable matter, such as, dry leaves, cereal straw, sawdust, or wood. If the C:N ratio is too high then "green waste" can be added that is nitrogen rich, such as, manure, food waste, grass clippings, etc. Also, different techniques in the art of composting can be utilized to aerate the piles of compostable matter within the compost updraft tower. This may include employing mechanical means to mix the compostable matter around during the composting process.

With respect to the various embodiments described herein, the compostable matter may be run through an industrial strength shredder before it enters the collector region of a compost updraft tower. Smaller pieces of compostable matter undergo composting more rapidly than larger pieces, and are easier to handle. Once the compostable matter has turned into composted matter, it can further be processed as it is removed from the compost updraft tower. This includes, among other things, further sorting, packaging, straining, and shredding. The composted matter may also be sent to another processing facility where it is further composted into pure humus, and extraneous non-compostable material is removed.

With respect to the various embodiments described herein, the compostable matter may be pre-sorted prior to entering the compost updraft tower or prior to shredding so as to remove recyclable material that cannot be composted. The recyclable material can be sent to a recycling facility to further reduce consumption of natural resources.

With respect to the various embodiments described herein, the dimensions of the tower and collector region of an updraft compost tower will vary depending on the specific design constraints and requirements of a given plan. In general, however, it is anticipated that collector regions of a compost updraft tower can be hundreds, thousands, or even tens of thousands of meters long in diameter. Similarly, the tower portion of a compost updraft tower can also be hundreds and even thousands of meters in height.

One or more of the components, steps, features, and/or functions illustrated in FIGS. 1, 2, 3, 4, 5, 6, 7, 8, 9, 10, 11, 12, 13, and/or 14 may be rearranged and/or combined into a single component, step, feature or function or embodied in several components, steps, features, or functions. Additional elements, components, steps, and/or functions may also be added without departing from the invention. The apparatus, devices, and/or components illustrated in FIGS. 1, 2, 3, 4, 5, 6, 7, 8, 9, 10, 11, 12, and/or 13 may be configured to perform one or more of the methods, features, or steps described in FIG. 14.

While certain exemplary embodiments have been described and shown in the accompanying drawings, it is to be understood that such embodiments are merely illustrative of and not restrictive of the present disclosure, and that the present disclosure should not be limited to the specific constructions and arrangements shown and described, since various other modifications are possible. Therefore, it is to be understood that, within the scope of the appended claims, embodiments of the present disclosure may be practiced other than as specifically described herein.

What is claimed is:

1. An apparatus comprising:
    a segmented collector region including a plurality of sectors each adapted to receive compostable matter that heats air within the sectors as the compostable matter composts;
    a hollow tower having a first end and a second end, the first end of the hollow tower coupled to the segmented collector region to allow airflows from the heated air in the plurality of sectors to flow from the plurality of sectors to the first end of the tower and then rise up through the hollow tower to the second end of the tower; and
    one or more turbines positioned in a path of at least one of the airflows to generate electricity;
    wherein each of the plurality of sectors are separated from one another by divider walls that extend out radially from the hollow tower, and each of the plurality of sectors includes at least one access point at an outer perimeter wall of the segmented collector region that is adapted to allow compostable matter to be introduced and removed from each sector at different times to maintain the compostable matter in the plurality of sectors at different stages of a composting cycle so that an amount of electricity generated by the one or more turbines is regulated.

2. The apparatus of claim 1, wherein the plurality of sectors surround the hollow tower.

3. The apparatus of claim 1, wherein at least a portion of the collector region includes a roof permeable to solar radiation, the solar radiation further heating air within one or more of the plurality of sectors of the collector region.

4. The apparatus of claim 1, wherein one or more of the sectors includes means for aerating compostable matter.

5. The apparatus of claim 4, wherein the means for aerating compostable matter includes aeration piping adapted to reside within a heap of compostable matter placed in the one or more sectors, the aeration piping adapted to deliver oxygen to the heap of compostable matter.

6. The apparatus of claim 1, wherein the outer perimeter wall of at least one sector includes an inlet fan that blows ambient air from outside the collector region into the at least one sector, and the apparatus further comprises a means for powering the inlet fan.

7. The apparatus of claim 1, further comprising:
    wherein the one or more turbines includes a tower turbine positioned within the hollow tower and adapted to generate electricity from airflow rising up from the first end to the second end of the hollow tower.

8. The apparatus of claim 7, further comprising:
    a turbine service support coupled to at least one of the hollow tower and/or the collector region, the turbine service support adapted to support the tower turbine outside of the hollow tower.

9. The apparatus of claim 1, further comprising:
at least one solar air heater mounted on a roof and/or a wall of the collector region and adapted to further heat air within one or more of the sectors of the collector region.

10. The apparatus of claim 1, wherein each access point at the outer perimeter wall of the segmented collector region is adapted to allow compostable matter to be introduced and removed from each sector at different times to maintain the compostable matter in the plurality of sectors at different stages of the composting cycle so that the amount of electricity generated by the one or more turbines remains constant.

11. An apparatus comprising:
a collector region adapted to receive compostable matter that heats air within the collector region as the compostable matter composts;
a hollow tower having a first end and a second end, the first end of the hollow tower coupled to the collector region to allow airflow from the heated air in the collector region to flow from the collector region to the first end of the tower and then rise up through the hollow tower to the second end of the tower;
at least one tower turbine adapted to be positioned within the hollow tower in a path of the airflow to generate electricity; and
a turbine service support coupled to at least one of the hollow tower and/or the collector region, the turbine service support adapted to receive and support the tower turbine and a reserve tower turbine outside of the hollow tower;
wherein the hollow tower includes a turbine service door that opens to allow the tower turbine to be removed from the hollow tower and be replaced by the reserve tower turbine, the turbine service support including a track adapted to secure the tower turbine and the reserve tower turbine and allow the tower turbine and the reserve tower turbine to be moved about the turbine service support.

12. The apparatus of claim 11, wherein the turbine service support extends around the entire perimeter of the hollow tower.

13. The apparatus of claim 12, wherein the track extends around at least 180 degrees of the hollow tower's perimeter.

14. A method comprising:
composting compostable matter within a plurality of sectors of a segmented collector region to release heat energy from the compostable matter, each of the plurality of sectors of the segmented collector region having an access point at a perimeter of the segmented collector region that is adapted to allow compostable matter to be introduced and removed from each sector;
generating an airflow in each of the plurality of sectors of the collector region by coupling a first end of a hollow tower to the collector region, the airflows moving through the plurality of sectors of the collector region to the first end of the hollow tower and then rising through the hollow tower to a second open end of the tower;
generating electricity by positioning one or more turbines in a path of at least one of the airflows; and
introducing the compostable matter into the plurality of sectors of the segmented collector region through the access points at different times to maintain the compostable matter in the plurality of sectors at different stages of a composting cycle so that an amount of electricity generated by the one or more turbines is regulated.

15. The method of claim 14, further comprising:
wherein the one or more turbines includes a tower turbine positioned within the hollow tower;
the method further comprising:
removing the tower turbine by moving the tower turbine out of the hollow tower and onto a turbine service support coupled to the hollow tower; and
positioning a reserve tower turbine within the hollow tower by moving the reserve tower turbine stored at the turbine service support into the hollow tower.

16. The method of claim 14, wherein the compostable matter is introduced into the plurality of sectors through the access points at different times to maintain the compostable matter in the plurality of sectors at different stages of the composting cycle so that the amount of electricity generated by the one or more turbines remains constant.

* * * * *